Feb. 12, 1924.
F. C. MARTIN
FLUID TRANSMISSION
Filed Aug. 3, 1921
1,483,824
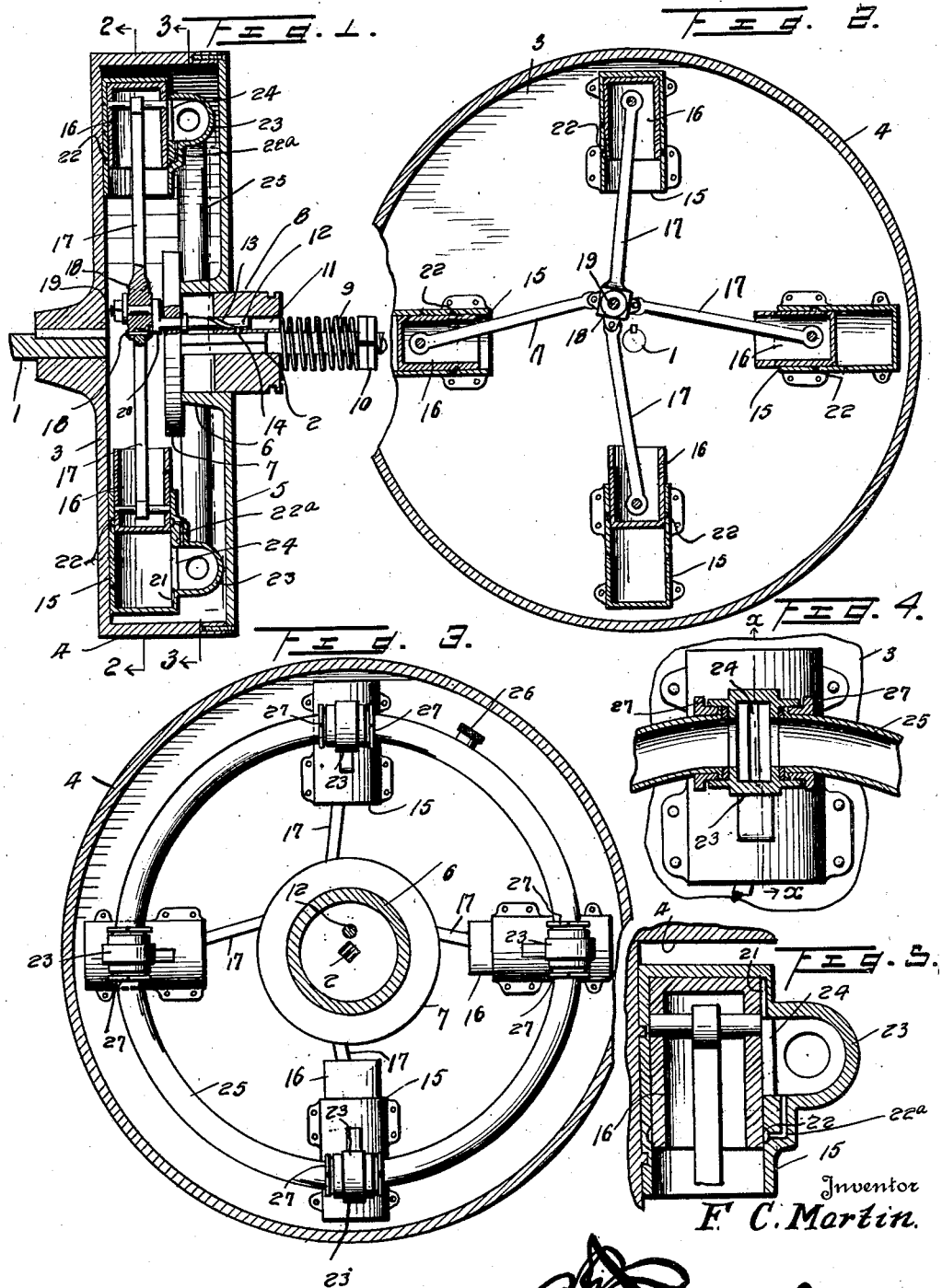
Inventor
F. C. Martin.

Patented Feb. 12, 1924.

1,483,824

UNITED STATES PATENT OFFICE.

FRANK C. MARTIN, OF PLATTSMOUTH, NEBRASKA.

FLUID TRANSMISSION.

Application filed August 3, 1921. Serial No. 489,525.

*To all whom it may concern:*

Be it known that I, FRANK C. MARTIN, a citizen of the United States, residing at Plattsmouth, in the county of Cass and State of Nebraska, have invented certain new and useful Improvements in a Fluid Transmission; and I do hereby declare the following to be a full, clear, and exact description of the invention, such as will enable others skilled in the art to which it appertains to make and use the same.

The invention relates to transmission mechanism whereby power imparted to a prime mover is delivered to a driven element in variable degree or proportionate ratio as required according to conditions and required results to be effected.

The present invention relates to fluid transmission and is particularly designed for utilizing a liquid medium, preferably oil, which is variably circulated by means of cooperating cylinders and pistons, the cylinders being connected by means of a conduit and the relative stroke of the pistons being adjustable according to the load and required speed.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a vertical central section of a fluid transmission constructed in accordance with and embodying the essential features of the invention.

Figure 2 is a transverse section on the line 2—2 of Figure 1 looking in the direction of the arrows.

Figure 3 is a similar section on the line 3—3 of Figure 1 looking to the left as designated by the arrows.

Figure 4 is a detail view showing more clearly the joint and manner of connecting the conduits with the cylinders, and Figure 5 is a sectional detail on the line *x—x* of Figure 4.

Corresponding and like parts are referred to in the following description and designated in the several views of the drawings by like reference characters.

The transmission embodies two aligned shafts 1 and 2, the former having the power applied thereto from a prime mover such as an engine of any type. The shaft 2 receives the power through the transmission and is adapted to be coupled to the mechanism or part to be ultimately driven. A drum or casing is rotatable with the shaft 1 and comprises a plate or disk 3, a band 4 and a head 5, the latter being detachable and consisting of a plate or disk having a central opening and an inwardly extending collar 6 in line with the opening. The band 4 is preferably formed with the plate or disk 3 and the latter is keyed or otherwise fastened to the shaft 1 so as to rotate therewith. A plate or disk 7 is secured to the inner end of the shaft 2 and is in close contact with the inner end of the collar 6. A collar 8 is slidable on the shaft 2 and rotatable therewith and is adjustable to admit of varying the stroke of the pistons as required. An expansible helical spring 9 mounted upon the shaft 2 is confined between the collar 8 and a set nut 10 threaded upon the shaft 2. An opening 11 is formed in the collar 8 parallel with the shaft 2 and at one side thereof. The shaft 12 mounted in the plate or disk 7 extends into the opening 11 and is formed in a side with a spiral groove 13 which receives a pin or stud 14 extending inwardly from the wall of the opening 11 and carried by the collar 8. Relative longitudinal movement of the collar 8 on the shaft 2 effects a turning of the shaft 12 whereby the stroke of the pistons may vary as hereinafter more fully set forth.

A plurality of cylinders 15 are disposed within the said drum or casing and are secured to the outer portion of the plate or disk 3. The cylinders 15 have a radial arrangement and are closed at their outer ends, the inner ends being open. A piston 16 is mounted in each of the cylinders 15 and its rod 17 is connected to a block 18 mounted upon a wrist pin 19 carried by a crank arm 20 at one end of the shaft 12. Each of the cylinders 15 has an oil duct 22ª leading from oil groove 22 to chamber 23 to drain oil that has accumulated in groove 22 caused by oil leaking past pistons 16. A chamber 23 at one side of each of the cylinders 15 is in communication with the cylinder by means of a narrow opening or slot 24. A groove 21 in a side of the cylinder connects the end thereof with the opening or port 24 to provide a passage between the outer end of the cylinder and the chamber 23. An annular conduit 25 connects the several cylinders 15 and is preferably composed of sections, as indicated most clearly in Figures 3 and 4, the several sections being coupled to the chambers 23 of the respective cylinders. The angular conduit 25 has a filling opening which is closed by means of a cap 26. The conduit sections are flanged at their ends and are secured to the coupling ends of the chambers 23 by means of nuts 27 in a manner well understood.

When the parts comprising the transmission are properly assembled the conduits 25, chambers 23 and outer ends of the cylinders 15 are filled with a fluid, such as oil. In operation, the motive power is applied to the shaft 1 causing the shafts 1 and 2 and their transmission to revolve. The pistons operating in the cylinders 15 cooperate therewith to impart a rotary movement to the collar 7 whereby the shaft 2 is rotated. The proportionate speed of the shaft 2 relatively to shaft 1 depends upon the relative stroke of the pistons and by varying their stroke any required speed in the range of adjustment may be attained. The stroke of the pistons is controlled by sliding adjustment of the collar 8 which may be moved by any well known means common in the art. Longitudinal movement of the collar 8 effects a corresponding movement of the pin or stud 14 carried thereby and said pin cooperating with the spiral groove 13 effects a turning of the shaft 12 and adjustment of the crank pin 19 which is moved to a greater or less distance from the axis of the shaft whereby variation of the piston stroke is effected as will be readily understood.

Having thus described the invention, what I claim is:—

1. A fluid transmission including a driving means carrying cylinders, pistons operable in said cylinders, a driven shaft, a plate carried by said driven shaft, a shaft journaled in said plate having a crank connected with said pistons, a collar slidable relatively to said shafts, said collar having an opening receiving said second shaft, and a spiral groove and stud connection between said second shaft and collar.

2. A fluid transmission including a driving drum carrying cylinders, pistons operable in said cylinders, a block to which said pistons are connected, a driven shaft, a collar slidable on said driven shaft, a collar in which said collar slides, a plate on said driven shaft in engagement with the second collar, a shaft journaled in said plate and having a crank connected with said block, the first collar having an opening into which said second shaft extends, a spiral groove and stud connection between said second shaft and first collar, and an expansive spring surrounding the driven shaft and engaging the same and the first mentioned collar.

In testimony whereof I affix my signature in presence of two witnesses.

FRANK C. MARTIN.

Witnesses:
M. F. MARTIN,
S. A. JOHNSON.